United States Patent
Gupta

(10) Patent No.: US 7,770,012 B2
(45) Date of Patent: *Aug. 3, 2010

(54) SYSTEM AND COMPUTER PROGRAM PRODUCT FOR SECURE AUTHENTICATION USING DIGITAL CERTIFICATES

(75) Inventor: Deepak Gupta, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 11/946,008

(22) Filed: Nov. 27, 2007

(65) Prior Publication Data

US 2008/0133920 A1    Jun. 5, 2008

Related U.S. Application Data

(63) Continuation of application No. 09/940,706, filed on Aug. 28, 2001, now Pat. No. 7,395,430.

(51) Int. Cl.
H04L 9/00   (2006.01)
H04L 9/32   (2006.01)

(52) U.S. Cl. .................. 713/175; 713/156; 713/166; 713/173; 713/182; 726/30

(58) Field of Classification Search .............. None
See application file for complete search history.

(56) References Cited

U.S. PATENT DOCUMENTS

| | | | |
|---|---|---|---|
| 6,253,322 B1 * | 6/2001 | Susaki et al. | 713/170 |
| 6,351,812 B1 * | 2/2002 | Datar et al. | 713/182 |
| 6,668,322 B1 | 12/2003 | Wood | |
| 6,678,828 B1 * | 1/2004 | Zhang et al. | 726/2 |
| 6,826,685 B1 * | 11/2004 | Douglas | 713/168 |
| 6,920,559 B1 * | 7/2005 | Nessett et al. | 713/168 |
| 2004/0093493 A1 * | 5/2004 | Bisbee et al. | 713/156 |

* cited by examiner

*Primary Examiner*—Kaveh Abrishamkar
(74) *Attorney, Agent, or Firm*—Anthony V S England; William H Steinberg

(57) ABSTRACT

The present invention provides in a method for providing secure authentication using digital certificates, an improvement to enable the selective transfer of authentication data. The said method comprises presentation of basic authentication data certified by an accepted certifying authority, at the commencement of a secure transaction and transfer of additional individual authentication data units against specific requests, as and when required, thereby eliminating the risks associated with providing any authentication data that is not required for a particular transaction.

The instant invention also provides a system and configured computer program product for carrying out the above method.

10 Claims, 2 Drawing Sheets

At client

SYSTEM AND COMPUTER PROGRAM PRODUCT FOR SECURE AUTHENTICATION USING DIGITAL CERTIFICATES

CROSS REFERENCE TO RELATED APPLICATION

This is a continuation of, and hereby claims the benefit of the priority date of, application Ser. No. 09/783,250 of Aug. 28, 2001.

FIELD OF THE INVENTION

The present invention relates to an improved method, system and computer program product for providing a secure authentication using digital certificates.

BACKGROUND OF THE INVENTION

Security is one of the prime concerns in internet applications these days. SSL is the most common means of securing communication. For Authentication, SSL and almost all other protocols use Digital Certificates or UserId/Passwords. Other Authentication means include Biometrics etc. Normally, in e-business related applications, the server is authenticated using a Certificate signed by a Certifying Authority. The authentication of the client is mostly dependent on the application. Sometimes it is done via UserId Password, sometimes via Digital Certificates or maybe not done at all.

The authentication, however, is singular and static. There is no means to dynamically authenticate the user. The problem is described in more detail below.

In SSL (Secure Socket Layer), the client needs to have a certificate signed by a Certificate Authority which is listed as trusted in the Servers Trusted Database. This enables it to access the application depending upon the access allowed to the user identified from the certificate. Now often, it is desirable that a user acts as two roles. A typical example would be a manager acting on behalf of his employee who may be on leave etc. In such cases, the server will not accept another certificate unless the session is broken and a new one established. Practically, speaking this means closing the browser or the application or wait for sometime for the timeout.

In SET (Secure Electronic Transaction), the client needs a Digital Credit Card i.e. special Digital Certificate with users Credit Card information to buy things online. Now, he might wish to use one card for some items while use another card for the other items.

In SET, from the Merchant point of view also, he might wish to offer some certificate to a group of clients and some to other. That is to say, if the client wishes to buy high valued items, the server wishes to present Certificate-A and if the client is buying low priced items, he wishes to present Certificate-B. A typical example would be a merchant who wishes to place his money from Diamond items in one bank and the rest in another. Another example would be a number of merchants selling stuff from a single mall/store. They would like to present their own certificates during payment on the SET protocol.

In Secure Email applications, the client authenticates himself/herself using the Email Certificate i.e. a special Digital Certificate with users' email information. With internet users having more than one email IDs, the requirement to change their Email preferences is all the more relevant even in case of personal desktop. Users may wish to send some mails using their official ID and others using their personal ones (hotmail etc).

In Secure Email applications, if the desktop is shared between users, the next user will have to close and open the application to view his mail i.e. to change the certificate. The equivalent of 'Switch ID' in Notes is not available.

Another major problem comes in applications that are providing all the above. They have some applications that require normal authentication using Digital Certificates. Simultaneously, they might also have a store where users can buy using SET certificates. He might also provide his users with the Secure Mail option. Now each of these would require a different type of X509 Certificate or a combined Certificate with all the 3 extensions.

The problem with 3 different certificates has been discussed above, i.e the user needs to timeout or restart the session to use a different service.

The combined Certificate solves the problem to some extent. However, there are some disadvantages.

1. If a new application is to be added, the certificates need to be reissued and retyped. Example would be: A site implements a SET based store and the client get SET Certificates from CAs, however after some time the site also provides a Secure Email facility. in that case, the users need to have a combined certificate. SO they have to get a new certificate. The certificates being issued by the CA also need to be reformatted to have an additional field related to E-mails. This would lead to confusion as the number of services increase, with different versions and types of certificates with the clients and the permutations and combinations of fields the CA would have to take care.

2. Combined Certificates also suffer from the disadvantage of disclosing the entire information of the user to the server, even if it is not required. For example, if a site only implements Secure Email, the user with a combined certificate will still send him all the information including the SET Details (Credit information) which is a security risk.

THE OBJECT AND SUMMARY OF THE INVENTION

The object of this invention is to obviate the above drawbacks and provide a solution that minimizes security risks.

To achieve the said objective, this invention provides in a method for providing secure authentication using digital certificates, an improvement to enable the selective transfer of authentication data comprising:

presentation of basic authentication data certified by an accepted certifying authority, at the commencement of a secure transaction, transfer of additional individual authentication data units against specific requests, as and when required, thereby eliminating the risks associated with providing any authentication data that is not required for a particular transaction.

The authenticity of said additional individual authentication data is established by using the public key provided in said basic authentication data.

The authenticity of said additional individual authentication data is established by signature of said accepted certifying authority.

The said additional individual authentication data is provided without the need for establishing a separate session.

The above improved method further comprises the facility to invalidate previously presented authentication data and present new authentication data and present new authentication data as and when required, thereby enabling establishment of new transactions without the need for closing an existing session.

The present invention further provides in a system for providing secure authentication using digital certificates, an improvement to enable the selective transfer of authentication data comprising:

means for presenting basic authentication data certified by an accepted certifying authority, at the commencement of a secure transaction, means for transferring additional individual authentication data units against specific requests, as and when required, thereby eliminating the risks associated with providing any authentication data that is not required for a particular transaction.

The authenticity of said additional individual authentication data is established by using the public key provided in said basic authentication data.

The authenticity of said additional individual authentication data is established by means of signature of said accepted certifying authority.

The said additional individual authentication data is provided without the need for establishing a separate session.

The above improved system further comprises the means for invalidating previously presented authentication data and present new authentication data and present new authentication data as and when required, thereby enabling establishment of new transactions without the need for closing an existing session.

The present invention also provides in a computer program product comprising computer readable program code stored on computer readable storage medium embodied therein for providing secure authentication using digital certificates, an improvement to enable the selective transfer of authentication data comprising:

computer readable program code means configured for presenting basic authentication data certified by an accepted certifying authority, at the commencement of a secure transaction, computer readable program code means configured for transferring additional individual authentication data units against specific requests, as and when required, thereby eliminating the risks associated with providing any authentication data that is not required for a particular transaction.

The authenticity of said additional individual authentication data is established by using the public key provided in said basic authentication data.

The authenticity of said additional individual authentication data is established by signature of said accepted certifying authority.

The said additional individual authentication data is provided without the need for establishing a separate session.

The said improved computer program product further comprises the computer readable program code means configured for invalidating previously presented authentication data and present new authentication data and present new authentication data as and when required, thereby enabling establishment of new transactions without the need for closing an existing session.

BRIEF DESCRIPTION OF THE DRAWINGS

The invention will now be described with reference to the accompanying drawings

DETAILED DESCRIPTION OF THE INVENTION

Figure 1:
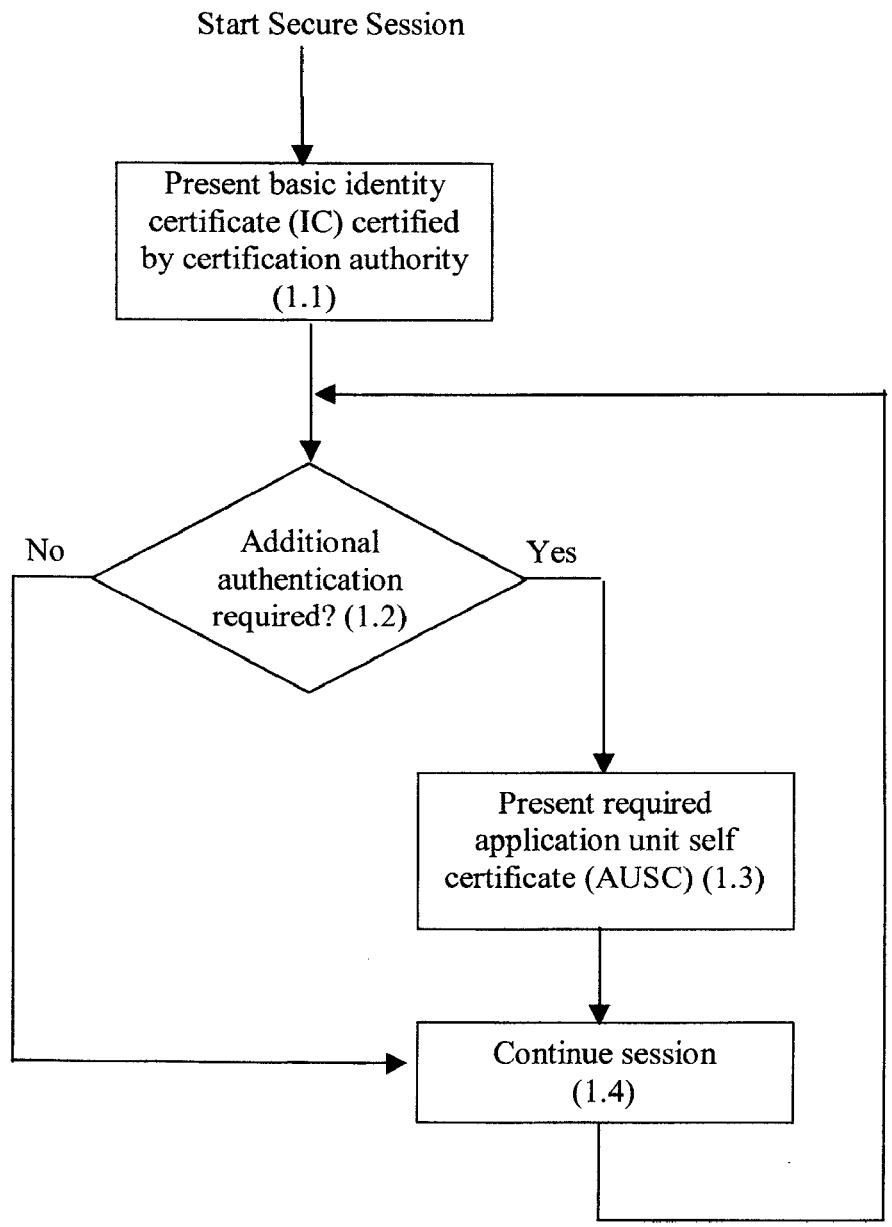
FIG. 1 shows the flow chart of the actions at the client, according to this invention.

In the proposed solution the user presents a General Purpose Certificate called the 'Identity Certificate' (IC)(1.1) at the start of the secure session. This would essentially be the normal X509 certificate with no extensions i.e. it will contain the Public Key of the holder alongwith his credentials (Name, Organization Unit, Organization, Address etc) and the Certificate Serial Number and Certificate Authority's Signature.

Current Certificates look like the image given below.
This certificate has been verified ☐for the following uses:
SSL Server Certificate
Email Signer Certificate
Email Recipient Certificate
Status Responder Certificate
    Name Class 4 Public Primary Certification Authority—G2, VeriSign, Inc., US
    Issued under: Verisign, Inc.
    Serial 32.88:BE:9A:D2:F5:EB:13:47:FB:7F:C4:20:37:25:F8 Number
    Validity: Mon May 18, 1998 to Wed Aug. 2, 2028
    Fingerprint: 26:6D:2C:19:98:B6:70:68:38:50:54:19:EC:90:34:60

The identity certificate for the same user could be:
This certificate has been verified ☐:
Name: Class 4 Public Primary Certificate Authority—G2, VeriSign, Inc., US
Issued under: VeriSign, Inc.
Serial: 32:88:8E:9A:D2:F5:EB:13:47:F8:7F:C4:20:37:25:F8 Number
Validity Mon May 18, 1998 to Wed 02, 2028
Fingerprint :26:6D:2C:19:98:B6:70:68:38:50:54:19:EC:90:34:60

Alongwith the IC, the entities would hold individual bits of information signed by their own private key (which may be signed by the CA or not). These would be called the 'Application Unit Self Certificate' (AUSC) where the AUSC would be different for different bits of information. Depending upon the transaction the user or the server would determine if additional authentication is required (1.2). If such authentication is necessary the holder would present the required AUSC (1.3) or continue session (1.4). The AUSCs can be signed by the Certification Authority or may not be signed by the CA. This is optional and the server has a choice to demand what it requires. This will be a configurable option in the web servers configuration file. Client Applications (including browsers) can also generate these Certificates on the fly in case the CA signature is not required. Clients will also have an option to initiate a handshake with the Server in which they will provide the AUSC to the server.

At the server end, the server will verify and accept the IC presented by the client (2.1). It would then determine whether or not any additional authentication was required (2.2) depending on the nature of the transaction as well as configured options. If additional authentication is necessary, the server would request such additional data (2.3) from the clients. Finally, the server would validate the AUSCs presented by the clients (2.4) by verifying the certification of the AUSCs presented by the client by the certification authority and other requirements specified on the configuration data. AUSCs would provide the extra bits of information required to access various services on the web site and only relevant AUSCs will be sent by the client to the server. In case, a similar AUSC has been already provided, it will be overwritten by the new AUSC. The server will have an access control mechanism (this will be the same as in current applications), in which it can administer which Identity Certificates can provide what types of AUSCs.

For example each user can have all the extensions fields currently in a SET certificate in a SET USC. He/She can have his email information in a Email USC. This would enable him to present the information selectively as and when required. In other words, the user can log on to the application with his IC and present his AUSCs as and when required.

An Email USC might look like:
This certificate has been verified [i]:
Name: Email unit Self Certificate
Value: deepakgupta@in.ibm.com
Issued under: VeriSig, Inc./Self
Serial: 32:88:8E:9A:D2:F5:EB:13:47:F8:7F:C4:20:37:25:F8 Number.
Validity: Mon May 18, 1998 to Wed 02, 2028
Fingerprint: 26:6D:2C:19:98:B6:70:68:38:50:54:19:EC:90:34:60

In the above, after presenting the Identity Certificate, if the user wishes to use Secure Email, the user may present his/her Email USC to the server and the server will be able to extract the public information, the email Id and other relevant information from the Email USC.

So if a website offers only general secured surfing on its site, the user can only present his IC to the server. This would authenticate the client to the server. The process of verifying would be the same as is being done for normal X509 Digital Certificates these days. This would include verifying the CA's signature on the Certificate and then identifying the user from the name on the Certificate. The point to note here is that after verification process, the users public key is also with the server. The only deviation in the present invention from normal SSL handshake would be that the server would store the clients public key in the session. This can be persisted in a database or stored in the memory depending upon the type of server application used.

Subsequently, the site adds the secure email facility to its web site, the user can then also present his/her Email USC to the server. The process of authenticating remains the same as before. However, when the client wishes to use the secure email facility, the server asks for the Email USC from the client which can then be presented. Since the user is already authenticated, the server holds the public key of the client. So the signature on the USC (which is of the client) can be verified by the server. Hence the email information of the client is passed on to the server securely without the CA having to issue another certificate. Same holds true for SET based applications and other applications.

Another advantage of the same is that the client can only expose the required fields to the server and hide the fields it does not want to show. For example if the client wishes to only surf a secured site, the client would not like to reveal any SET credentials and email address to the server on which the client is surfing. Having a common certificate would not help. Having USCs would solve the problem automatically.

The client would also have an option in the client software (including browsers) to invalidate a previously presented Certificate and present a new one. This would be similar to implementing the LogOut Option by the websites i.e. a request to break the session and start a new one. Nothing special is being claimed or proposed here except from the fact that the option of providing the LogOut option is built in with the client applications. Currently the web sites provide a link or button to do so. Building it in the client applications would allow the users to change their Identity Certificates also in between without closing their browsers (or other client applications) and restarting them.

Figure 2:
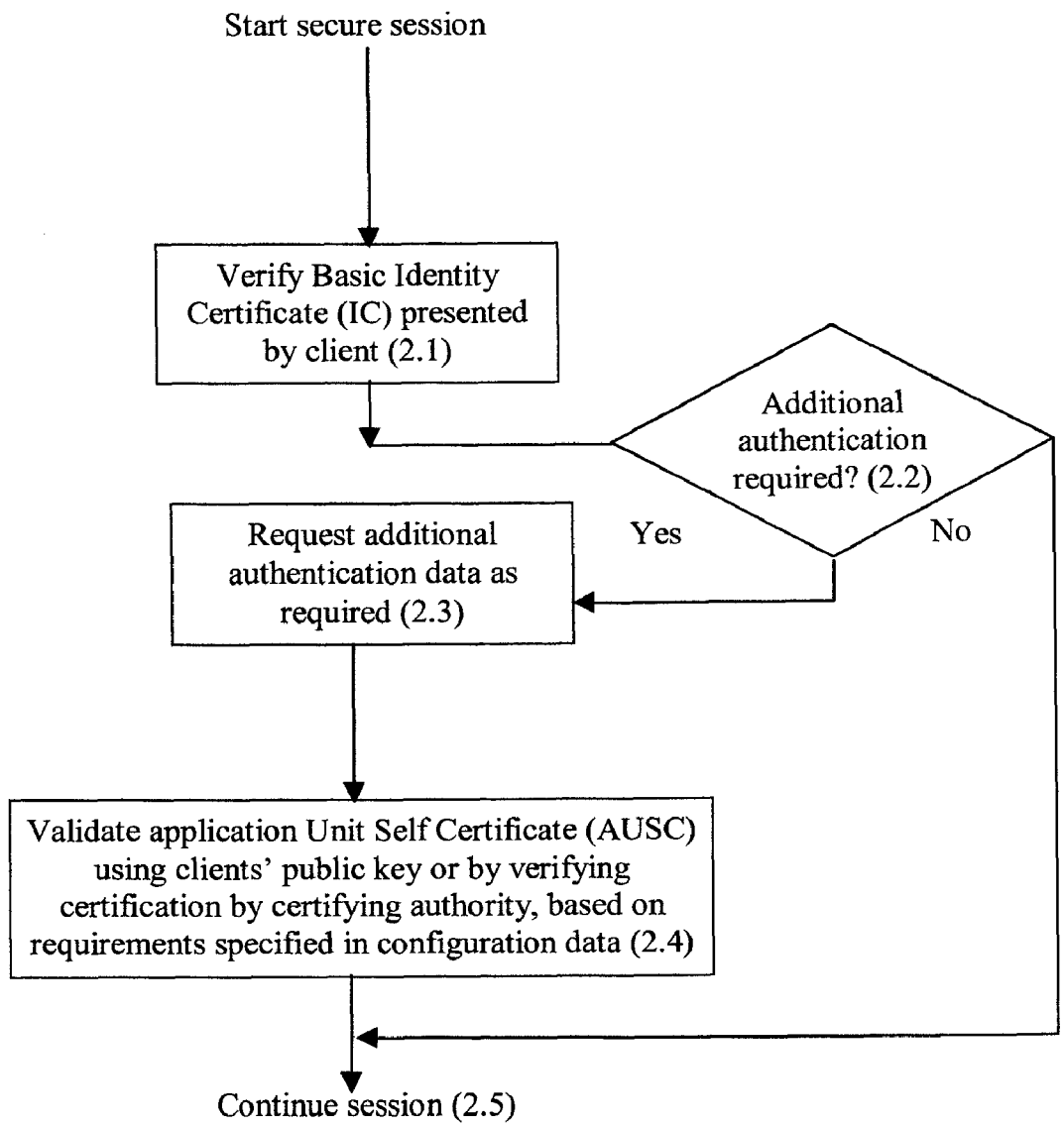
FIG. 2 shows the flow chart of the actions at the server, according to this invention.

Working:
The flow of activities between the Server and the Client, as shown in FIGS. 1 & 2 would be:
1. Normal Handshake as in the current protocols with the Client presenting the Identity Certificate only. (1.1)
2. The server verifies the IC (2.1) and determines whether or not additional authentication is required (2.2). If additional authentication is necessary the server generates a request on the client (2.3)
3. The client received the request from the server and determines the nature of the additional requirements (1.2). Optionally, the client may also itself determine what additional authentication data it needs to send (1.2). The client accordingly presents the required AUSC to the server (1.3)
4. The server verifies the AUSC using clients' public key or by verifying certification by certifying authority, based on requirements specified in configuration data (2.4) The Server can specify in the Server configuration, if it will accept AUSCs signed only by the user of the signature of the CA is mandatory on the AUSCs also. This would be as per the security requirements of the web site.
5. The session continues (1.4) and (2.5). At any point of time, the server can request the client for a particular AUSC. Also, at any point of time, the client can initiate and present another AUSC. If a similar AUSC has been presented before, the previous one will be overwritten by the new one.

At the server, each Identity Certificate/User can be given fine grained access. Which user can present which types of AUSC and the rights associated with all ICs and AUSCs can be defined. (The mechanism for the same would be similar to the one used currently for normal Digital Certificates).

In the above discussion, the examples have been explained assuming the client having the IC and the ASUCs, however the same can be implemented at the server side also. This would allow the websites to switch their certificates depending upon the activities of the client. The reasons for having multiple certificates at server can be many. A relevant situation would be a merchant in SET who wished to switch his Bank if the client is buying high valued items OR he may wish to put his money from some special items in a separate acquirer Bank OR he may wish to have higher bit encryption for high valued items and so on.

The examples have mentioned SET and Secure Email, however they are only examples, the solution is towards all applications that require Digital Certificates and special extensions to the same.

The proposed solution is also scalable and any new application that comes in future can be simply added in the framework by means of a simple new Application USC.

The invention claimed is:
1. A system for providing secure authentication, the system comprising:
means for sending basic authentication data from a first computer to a second computer wherein the basic authentication data provides a certificate including a validity status date and a credential, the credential being for permitting a first type of transaction by the first computer to an application provided by the second computer, wherein the basic authentication data has been certified by an accepted certifying authority, and the basic authentication data sent to the second computer includes a public key of the first computer;

means for generating an additional individual authentication data unit by the first computer, wherein the additional individual authentication data unit provides a self certificate including a validity status date and a credential, the self certificate credential being for permitting a second type of access by the first computer to an application provided by the second computer, and wherein the means for generating includes:

means for signing the individual authentication data unit by the first computer using a key associated with the public key; and means for sending the additional individual authentication data from the first computer to the second computer, so that the second computer can verify authenticity of the additional individual authentication data unit using the first computer's public key that was received from the first computer by the second computer with the basic authentication data.

2. The system as claimed in claim 1 wherein the second type of access includes an access for an application in which a digital credit card is used for a purchase.

3. The system as claimed in claim 1, wherein the authenticity of said additional individual authentication data is established by means of signature of said accepted certifying authority.

4. The system as claimed in claim 1, wherein the second type of access includes an access for an application in which an email message is securely transmitted.

5. The system as claimed in claim 1, wherein the authentication data includes an identity certificate, and the system includes:

means for sending a command from the first computer for the second computer to invalidate a previously presented identity certificate, wherein the previously presented identity certificate includes a validity status date and an identity credential;

means for generating by the first computer a new identity certificate having a validity status date and an identity credential; and sending, from the first computer to the second computer, the new identity certificate to replace the invalidated identity certificate, wherein the command to invalidate and the new identity certificate are both received by the second computer during the certain communication session.

6. A computer program product comprising computer readable program code stored on computer readable storage medium embodied therein for providing secure authentication, the computer program product comprising:

computer readable program code configured for sending basic authentication data from a first computer to a second computer, wherein the basic authentication data provides a certificate including a validity status date and a credential, the credential being for permitting a first type of transaction access by the first computer to an application provided by the second computer, wherein the basic authentication data has been certified by an accepted certifying authority, and the basic authentication data sent to the second computer includes a public key of the first computer;

computer readable program code configured for generating the additional individual authentication data unit by the first computer, wherein the additional individual authentication data unit provides a self certificate including a validity status date and a credential, the self certificate credential being for permitting a second type of access by the first computer to an application provided by the second computer, and wherein the computer readable program code configured for generating includes:

computer readable program code configured for signing the individual authentication data unit by the first computer using a key associated with the public key; and computer readable program code means configured for sending the additional individual authentication data from the first computer to the second computer, so that the second computer can verify authenticity of the additional individual authentication data unit using the first computer's public key that was received from the first computer with the basic authentication data by the second computer.

7. The computer program product as claimed in claim 6, wherein the second type of access includes an access for an application in which a digital credit card is used for a purchase.

8. The computer program product as claimed in claim 6, wherein the authenticity of said additional individual authentication data is established by signature of said accepted certifying authority.

9. The computer program product as claimed in claim 6, wherein the second type of access includes an access for an application in which a digital credit card is used for a purchase.

10. The computer program product as claimed in claim 6, wherein the authentication data includes an identity certificate, and the computer program product includes: computer readable program code configured for generating a command from the first computer for the second computer to invalidate a previously presented identity certificate, wherein the previously presented identity certificate includes a validity status date and an identity credential; and computer readable program code configured for generating a new identity certificate having a validity status date and an identity credential; and computer readable program code configured for sending from the first computer to the second computer, the new identity certificate to replace the invalidated identity certificate, wherein the command to invalidate and the new identity certificate are both received by the second computer during the certain communication session.

* * * * *